United States Patent
Brewer et al.

(10) Patent No.: US 7,303,127 B2
(45) Date of Patent: Dec. 4, 2007

(54) PACKAGED MEMORY DEVICES WITH VARIOUS UNIQUE PHYSICAL APPEARANCES

(75) Inventors: Wesley G. Brewer, Newport Coast, CA (US); Hem P Takiar, Fremont, CA (US); Robert C. Miller, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 371 days.

(21) Appl. No.: 10/902,899

(22) Filed: Jul. 29, 2004

(65) Prior Publication Data

US 2006/0022055 A1 Feb. 2, 2006

(51) Int. Cl.
*G06K 7/10* (2006.01)
(52) U.S. Cl. ................... 235/457; 235/488
(58) Field of Classification Search ........... 235/457, 235/488, 492; 345/536, 531, 554
See application file for complete search history.

(56) References Cited

U.S. PATENT DOCUMENTS

| | | | |
|---|---|---|---|
| 4,139,955 A | 2/1979 | Reiback | |
| 4,313,984 A * | 2/1982 | Moraw et al. | 428/13 |
| 4,324,421 A * | 4/1982 | Moraw et al. | 283/75 |
| 4,337,590 A | 7/1982 | Jackson | |
| 4,663,869 A | 5/1987 | Nakagawa | |
| 4,763,789 A | 8/1988 | Questel et al. | |
| 4,921,319 A | 5/1990 | Mallik | |
| 4,971,646 A | 11/1990 | Schell et al. | |
| 5,003,915 A | 4/1991 | D'Amato et al. | |
| 5,044,707 A | 9/1991 | Mallik | |
| 5,200,794 A | 4/1993 | Nishiguma et al. | |
| 5,429,393 A | 7/1995 | Parlo | |
| 5,527,606 A * | 6/1996 | Kikuchi | 428/324 |
| 5,528,825 A | 6/1996 | Miyauchi et al. | |
| 5,743,038 A | 4/1998 | Soto | |
| 5,757,521 A * | 5/1998 | Walters et al. | 359/2 |
| 5,787,618 A | 8/1998 | Mullis | |
| 6,101,748 A | 8/2000 | Cass et al. | |
| 6,125,564 A | 10/2000 | Young | |
| 6,140,936 A | 10/2000 | Armstrong | |
| 6,164,548 A * | 12/2000 | Curiel | 235/487 |
| 6,322,875 B1 | 11/2001 | Kimura | |
| 6,328,209 B1 | 12/2001 | O'Boyle | |
| 6,501,163 B1 * | 12/2002 | Utsumi | 257/679 |

(Continued)

FOREIGN PATENT DOCUMENTS

| | | |
|---|---|---|
| DE | 296 20 074 U1 | 3/1997 |
| DE | 203 04 467 U1 | 11/2003 |
| EP | 1 047 016 A1 | 10/2000 |
| JP | 2001009965 | 1/2001 |

OTHER PUBLICATIONS

Bone, Eric et al., "Storage Device", Design U.S. Appl. No. 29/206,851, filed Jun. 2, 2004, 5 pages.
Examiner's Report, European Patent Application No. 05 773 792.6 for SanDisk Corporation, mailed May 31, 2007, 4 pages.

*Primary Examiner*—Uyen-Chau N Le
(74) *Attorney, Agent, or Firm*—Davis Wright Tremaine LLP

(57) ABSTRACT

Surface optical characteristics, alpha-numeric markings and other design features of memory cards, flash drives and similar devices combine to provide the devices with unique outer appearances. In one example, markings are held a distance from a reflective surface such that reflections of the markings off the surface are visible adjacent the markings. In another example, a diffusely reflecting rainbow hologram is combined with such markings or other design features.

21 Claims, 2 Drawing Sheets

U.S. PATENT DOCUMENTS

| | | |
|---|---|---|
| 6,581,839 B1 * | 6/2003 | Lasch et al. ................. 235/487 |
| 6,608,911 B2 | 8/2003 | Lofgren et al. |
| 6,656,566 B1 | 12/2003 | Kuykendall et al. |
| 6,900,767 B2 * | 5/2005 | Hattori ........................ 343/702 |
| 6,954,293 B2 * | 10/2005 | Heckenkamp et al. ......... 359/2 |
| 7,080,783 B2 * | 7/2006 | Dilday et al. ................ 235/454 |
| 7,090,935 B2 * | 8/2006 | Azakami et al. ............. 428/834 |
| 7,106,337 B2 * | 9/2006 | Lu ............................... 345/536 |
| 2003/0052398 A1 | 3/2003 | Utsumi |
| 2004/0050936 A1 * | 3/2004 | Look et al. ............... 235/462.1 |
| 2006/0038023 A1 * | 2/2006 | Brewer et al. ............... 235/492 |

* cited by examiner

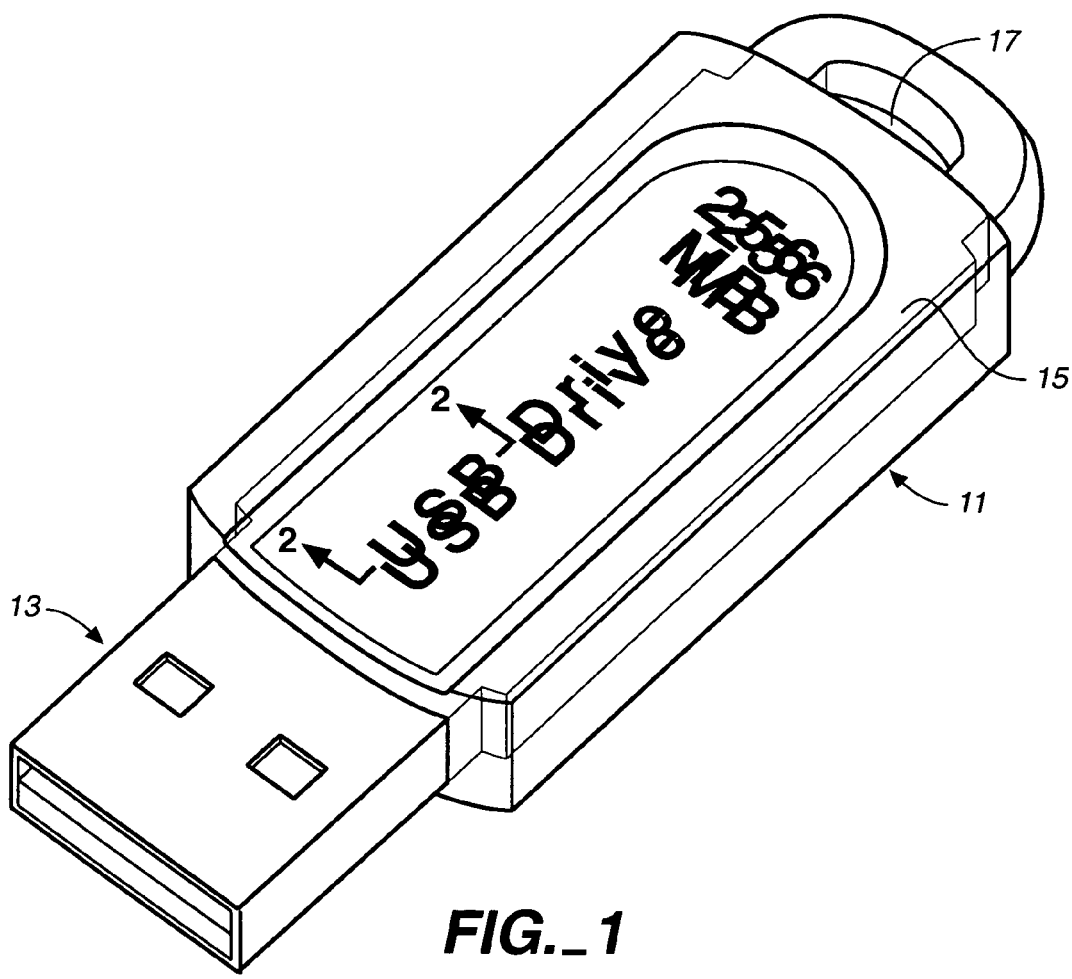
FIG._1
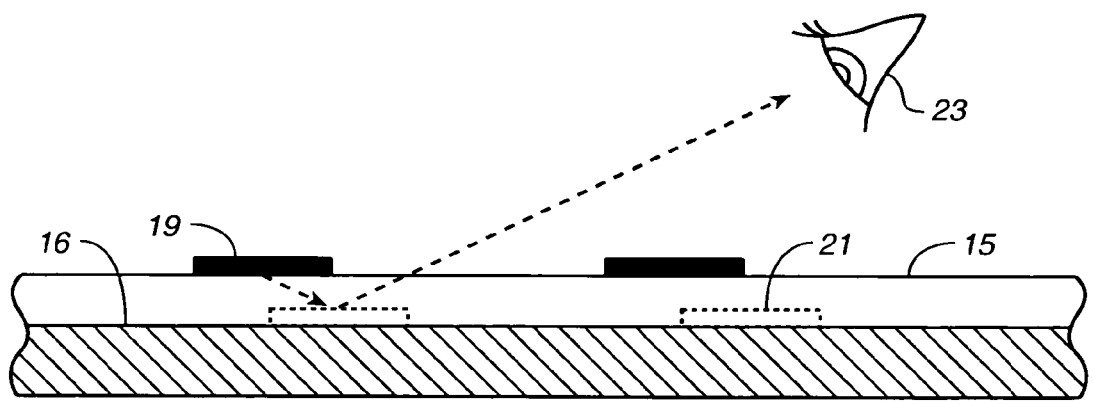
FIG._2

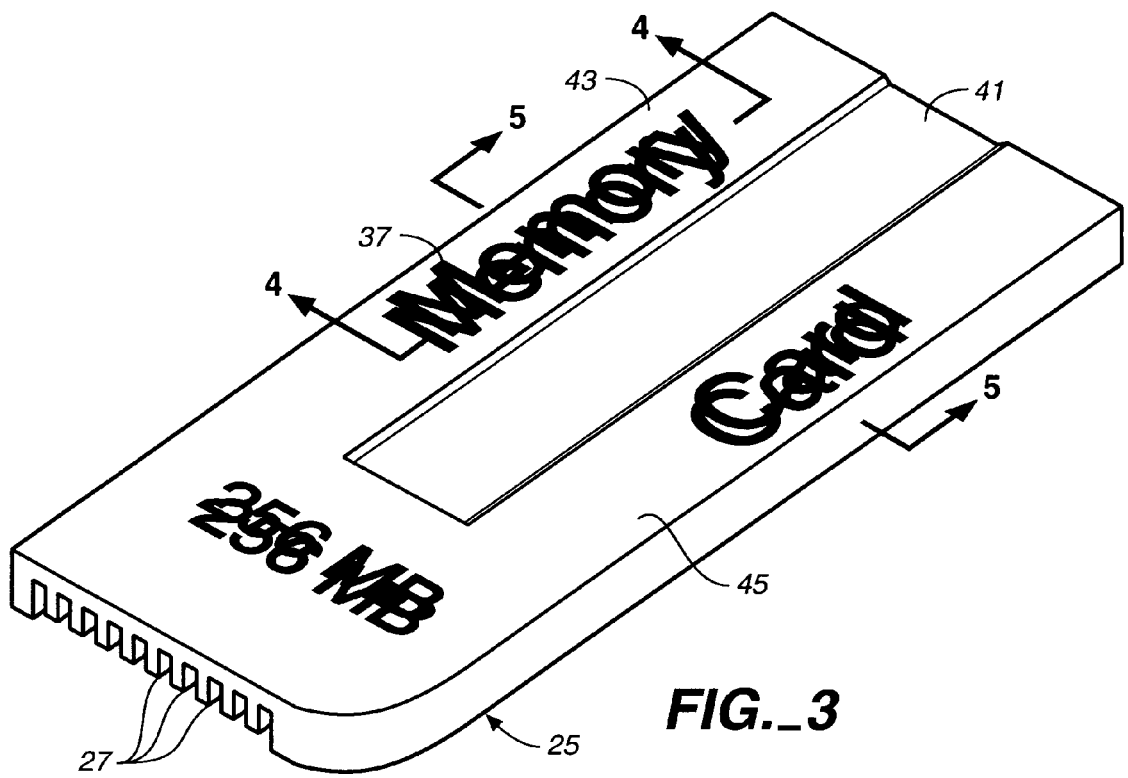
FIG._3
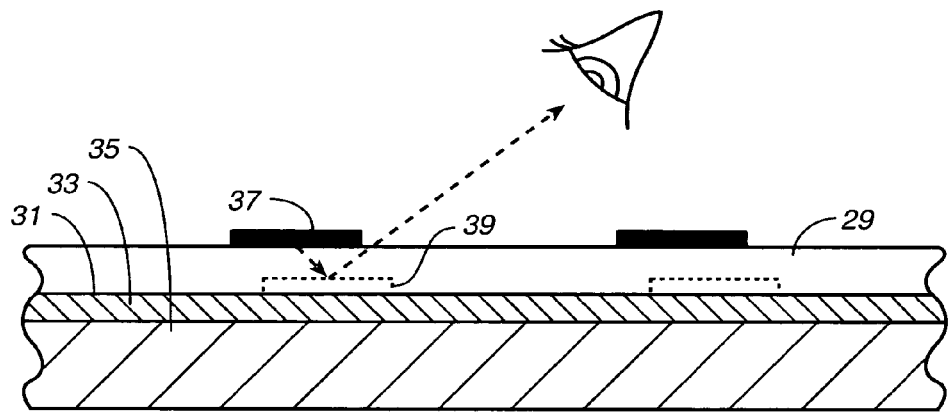
FIG._4
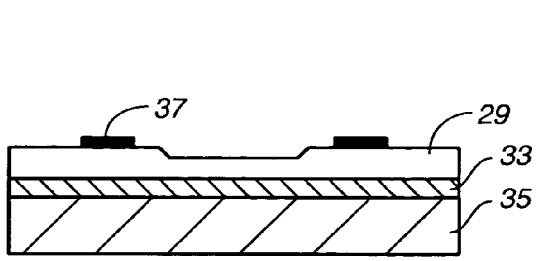
FIG._5
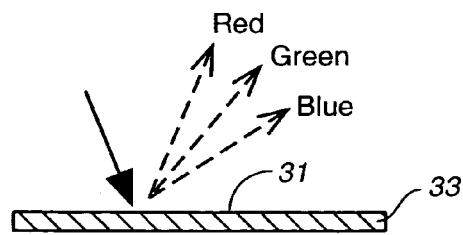
FIG._6

PACKAGED MEMORY DEVICES WITH VARIOUS UNIQUE PHYSICAL APPEARANCES

CROSS-REFERENCE TO RELATED APPLICATION

This is related to an application entitled "Customized Non-volatile Memory Device Packages" being filed concurrently herewith by Brewer et al. This related application is hereby incorporated herein in its entirety for all purposes by this reference.

BACKGROUND OF THE INVENTION

This invention relates generally to the packaging of small, hand-held portable re-programmable non-volatile memory cards, flash drives and other such devices, and, more specifically, to a combination of letters, numbers and/or other indicia with surface optical characteristics to form a unique overall appearance of such devices.

Electronic non-volatile memory cards are used with personal computers, notebook computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls operation of the memory cell array and interfaces with a host to which the card connected. Flash memory cards have been commercially implemented according to a number of well-known standards. Popular types include CompactFlash (CF), MultiMediaCard (MMC), Secure Digital (SD), and Memory Stick, each of which is a sold by SanDisk Corporation, the assignee hereof. These portable, hand-held memory cards are small, the largest length being 50 mm., the largest width 36.4 mm. and the largest thickness being 3.3 mm. More recently, even smaller memory cards have come to the marketplace, including the miniSD and TransFlash cards of SanDisk Corporation.

Other small, hand-held re-programmable non-volatile memory devices have also been made to interface with a computer or other type of host by including a Universal Serial Bus (USB) connector plug. These are especially convenient since personal computers, PDAs and other types of hosts commonly include one or more USB connector receptacles but may not have a receptacle slot that accepts any of above identified standard memory cards. There are several USB flash drive products commercially available from SanDisk Corporation under its trademark Cruzer. USB flash drives are typically shaped differently than the memory cards described above but contain memory with the similar amounts of data storage capacity. The mid-sized Cruzer flash drives have an elongated shape with a length of about 70 mm., including the USB connector plug at one end, a width of about 18 mm. and thickness of about 8 mm. The trend is to make flash drives smaller.

The memory card and flash drive devices contain markings on an outside surface that typically give the storage capacity of the memory therein, the name and/or trademark of the seller and possibly other design elements that significantly contribute to the overall appearance of the product.

SUMMARY OF THE INVENTION

Briefly and generally, particular optical characteristics and design features are combined to provide products with unique outer appearances, particularly on the above-mentioned memory devices. Specifically, in one form, markings are carried by a transparent layer a distance from a background surface such that a reflection and/or a shadow of the markings are visible through the transparent layer a distance behind the markings and shifted slightly along the background surface. The markings are thereby viewed with a sense of depth. This may be combined with a hologram on the background surface, such as a diffusely reflecting rainbow hologram. In another form, a hologram is combined with other design features such as a partially transparent covering layer that has different degrees of light diffusive characteristics across its surface. Particular combinations of various surface optical characteristics, markings and other design features give unique appearances to the products.

Additional aspects, advantages and features of the present invention are included in the following description of exemplary examples thereof, which description should be taken in conjunction with the accompanying drawings.

BRIEF DESCRIPTION OF THE DRAWINGS

FIG. 1 is a perspective view a flash drive with a first example combination of visual components;

FIG. 2 shows a cross-section of the flash drive of FIG. 1, taken at section 2-2 thereof;

FIG. 3 is a perspective view a memory card with a second example combination of visual components;

FIG. 4 shows a first cross-section of the memory card of FIG. 3, taken at section 4-4 thereof;

FIG. 5 shows a second cross-section of the memory card of FIG. 3, taken at section 5-5 thereof; and FIG. 6 illustrates certain optical characteristics of a surface the memory card of FIG. 3.

DETAILED DESCRIPTION OF EXEMPLARY EMBODIMENTS

A first embodiment of a product package according to the present invention is illustrated in FIG. 1 to be implemented on a commercially available flash drive memory device. The flash drive includes a main body portion 11 that has one or more integrated circuit chips containing re-programmable non-volatile memory cells, and usually a separate controller integrated circuit chip. The controller is connected between the memory chips and an input-output connector, in this case a plug 13 according to the specifications for the Universal Serial Bus (USB). The plug 13 is typically inserted into a mating USB receptacle on a personal computer (PC), personal digital assistant (PDA) or other host system. Electrical contacts within the plug 13 then connect with corresponding contacts of the receptacle. Data is then transferred between the host and the memory chip(s) within the flash drive, through the plug 13.

As best seen from the section 2-2 of FIG. 1 that is shown in FIG. 2, a plastic layer 15 covers at least a portion of an area of the device. In the flash drive illustrated, the circuit chips are within an elongated rectilinear metal shell forming the plug 13 at one end and having a hole 17 at its other end for attaching the device to a key chain, necklace or the like. The plastic layer 15, in this case, surrounds the metal on all sides except for the plug 13. But what is of most interest here is an area of the layer 15 that carries letters, numbers, and other forms of indicia, markings or design elements on its outer surface. In at least this area, through which the section 2-2 of FIG. 2 is taken, the layer 15 contacts the outer metal shell 16 and is at least partially optically transparent so that the metal surface may be viewed through the layer 15. In this example, the layer 15 is substantially optically clear. The indicia "USB Drive" specify the type of device, and "256 MB" the storage capacity of the memory within it. These indicia are preferably opaque, such as being a solid black or some other color, but can alternatively have some amount of transparency. Further, the indicia may include letters outlined in one color while the area within the outline is another color. Many variations are possible for the indicia to be viewed either as a reflection from the background surface 16 and/or as a shadow on it.

As a result of the background surface 16 under the layer 15 normally being polished metal, in this specific example, it has a high degree of reflectivity. The thickness of the layer 15 under these indicia is made sufficient so that an underside of the indicia reflect off of the surface 16 and the reflection is visible in a position adjacent the indicia. This result is shown in FIG. 1. In FIG. 2, a portion 19 of these markings is shown to form a reflection 21 that is viewable through the layer 15 by an observer 23. As the position or angle of the observer 23 changes with respect to the marking 19, the position of the reflection 21 changes with respect to the marking 19.

The minimum desirable thickness of the layer 15, and thus the minimum distance of the marking 19 from the reflective surface 16, to bring about this optical effect varies with the particular application but will generally be between 0.3 mm. and 2.0 mm., somewhere between 0.5 and 1.0 millimeter being a practical minimum. If the layer 15 becomes too thick, such as in excess of something between 4 and 6 millimeters, the reflections can appear so far displaced from the indicia when viewed from certain angles that a visual connection between the reflections and the markings is not immediately apparent. A significantly different overall appearance from that of FIG. 1 can result.

In addition to the reflections, shadows of the characters and other indicia on the surface 16 may be visible under certain conditions. Shadows may become visible when the incident illumination is strong and collimated. The degree of reflectivity of the surface 16 affects the strength of the reflections and therefore whether shadows of the indicia are noticeable. Also, the distance between the markings 19 and the surface 21 affect whether the shadows appear to the viewer.

Rather than using a polished metal surface 16, it may be made less reflective, even diffusely reflective. The reflections may not then be as strong but they will appear to the viewer. A diffusely reflective rainbow hologram, as used in another embodiment described below, may also be positioned to form the surface 16.

The layer 15 need not be totally optically clear. For instance, the layer 15 can be tinted to a particular color to give the flash drive a different visual effect. This may attenuate the contrast of the reflections and/or shadows somewhat but not eliminate their visibility so long as the amount of tinting is kept low enough. The layer 15 can even be made to have a degree of light diffusion or scattering without eliminating the viewability of the reflections and/or shadows. As a further variation, different regions of the surface 16 and/or various regions of the layer 15 of a single flash drive can be made to have different visible characteristics. The appearance need not necessarily be uniform across the product surface.

In the example of FIGS. 1 and 2, it is the back side of the same markings that are viewable from the front which are reflected from the surface 16. Light enters the layer 15 through transparent areas surrounding the markings and is reflected off the surface 16 to illuminate the back side of the markings. The reflection is thus the same as what is viewed directly from the front appears spatially separated.

As an alternative, an opaque layer could be placed in a small area behind the markings visible from the front and some other indicia or design then placed behind that opaque layer. It is the rear indicia or design that would then be illuminated and visible in reflection from the surface 16, not what is visible directly from the front. The appearance would be quite different from what is shown in FIGS. 1 and 2.

The outer surface of the layer 15 on which the markings are attached is not significantly reflective, so multiple reflections inside of the layer 15 are not visible from the surface 16. If the layer 15 is made of a material having an internally reflective outer surface, however, several reflections of the markings may be visible at different levels behind the layer 16. This also would significantly change the appearance of the product from what is shown in FIGS. 1 and 2.

In the embodiment shown, nothing is printed or marked directly on the surface 16. But this could be added, again likely to substantially change the appearance of the memory device that is illustrated in FIGS. 1 and 2.

Although the cover 15 is illustrated in FIG. 1 to be molded tightly around the main body portion of the flash drive, the cover may alternatively be made as a separate sleeve that is inserted onto the flash drive by hand or a simple machine. This is described in the concurrently filed application cross-referenced above.

As a second embodiment of the present invention illustrated in FIGS. 3-6, a memory card 25 is packaged to have similar visual characteristics but includes additional features. The illustrated card 25 is a Memory Stick card but the packaging techniques described herein are not limited to any particular memory card. External electrical contacts (not shown) lie within grooves 27 on one side of the card and various markings are carried by an opposite side of the card. Alpha-numeric characters are printed on, or otherwise applied to, a top surface of a cover layer 29 that is transparent enough to view a background surface 31 through it.

In this example, the background surface 31 is a front face of a reflective hologram film 33 that is adhesively attached on its opposite side to an underlying substrate 35, such as a molded plastic surface of the card 25. The hologram 33 is preferably a rainbow hologram, wherein polychromatic light incident on its surface 31 is diffusely diffracted into a rainbow pattern of different colors that are visible at various angles of view. This is illustrated by FIG. 6. The background color of the card viewed in ordinary interior or exterior light is therefore a spread of diffuse light with a predominate color that depends upon the angle of view. The thickness of the layer 29 is made to be within the range described above for the layer 15 of the embodiment of FIGS. 1-2 and the card otherwise structured so that reflections and/or shadows of the markings on the top surface of the layer 29 are therefore also viewable on the reflective hologram surface 31. A backside of a portion 37 of the top surface markings, for example, is reflected at 39 from the surface 31. The rainbow holographic reflections appear in the background between the top surface markings and their reflections. This combination of effects provides a very attractive memory card. Other types of holograms can be used instead to bring about somewhat different visual effects.

In the memory card 25 of this example, a roughened strip 41 is provided for the user to note by pencil or pen the contents of the data stored in the card's non-volatile memory, as in existing Memory Stick cards. This also diffuses and scatters any light passing through the strip 41. Neighboring regions 43 and 45 can retain an absence of any significant light scattering characteristic or made to have a degree of light scattering that is visibly different from that of the strip 41. In this example, the hologram film 33 extends under all of the regions 41, 43 and 45. As a result, light reflected from the rainbow hologram surface 31 through these different areas of the layer 29 appear to have different textures.

The layer 29 may be made substantially optically clear or may alternatively contain a color dye. This can additionally affect the overall appearance of the card 25 by a filtering effect of the colored layer 29 on the light reflected from the hologram surface 31. As a further variation, only a portion of the layer 29 may be colored, or different portions can have different colors. Various combinations of the layer 29 with some degree of light scattering and/or coloring, the diffuse rainbow reflections of the hologram 33 and the reflections and/or shadows on the surface 31 of the markings on the outside of the layer 29 are visually pleasing for the memory card. Other variations discussed above with respect to the first embodiment of FIGS. 1-2 can also be incorporated in this second embodiment of FIGS. 3-6.

Although the memory card illustrated in FIGS. 3-6 is shown to be constructed as a unitary unit, the layer 29 may alternatively be included as part of a separate sleeve that is inserted onto a molded memory core by hand or a simple machine. This is described in the concurrently filed application cross-referenced above.

Although the various aspects of the present invention have been described with respect to exemplary embodiments thereof, it will be understood that the present invention is entitled to protection within the full scope of the appended claims.

It is claimed:

1. A non-volatile re-programmable memory device that comprises on an outside thereof:
   a background surface characterized by diffracting and reflecting light incident thereon,
   a cover positioned over the background surface with an outer surface of the cover displaced a distance from the background surface within a range of 0.3 to 6.0 millimeters, said cover being at least partially optically transparent to allow viewing of the background surface therethrough,
   visible markings positioned on the outer surface of the cover in a manner that patterns of the visible markings cast on the background surface are themselves visible through the cover adjacent the visible markings, and
   electrical contacts accessible from outside of the device communicating with non-volatile re-programmable memory inside the device.

2. The memory device of claim 1, wherein the background surface includes a hologram.

3. The memory device of claim 2, wherein the hologram includes a diffusely reflecting rainbow hologram.

4. The memory device of claim 1, wherein at least a portion of the cover is optically clear.

5. The memory device of claim 1, wherein at least a portion of the cover is tinted.

6. The memory device of claim 1, wherein the visible markings includes alpha-numeric characters.

7. The memory device of claim 1, wherein the visible markings include opaque visible markings.

8. The memory device of claim 1, whereby the patterns cast on the background surface include reflections of back sides of the visible markings from the background surface.

9. The combination of claim 1, wherein the memory device is a memory card.

10. The combination of claim 1, wherein the memory device is a flash drive.

11. A non-volatile re-programmable memory device that comprises on an outside thereof:
    a hologram surface characterized by diffracting and reflecting light incident thereon,
    a cover positioned over the hologram surface with an outer surface displaced a distance from the hologram surface,
    a visible pattern attached to the cover outer surface, wherein the cover is at least partially optically transparent and the displaced distance is such that a reflection of the visible pattern from the hologram surface is visible through the cover adjacent the pattern, and
    electrical contacts accessible from outside of the device communicating with non-volatile re-programmable memory inside the device.

12. The memory device of claim 11, wherein the hologram surface includes a diffusely reflective rainbow hologram.

13. The memory device of claim 11, wherein the distance that the cover outer surfaced is displaced from the hologram surface is in a range of 0.5 to 4.0 millimeters.

14. The memory device of claim 11, wherein the visible pattern attached to the cover outer surface is positioned at least in part on a side of the memory package opposite the electrical contacts.

15. A non-volatile re-programmable memory device that comprises on an outside thereof:
    an optical surface characterized by diffusely reflecting polychromatic light incident thereon into a plurality of spatially separated colors,
    a cover positioned over the optical surface and having an outer surface area,
    visible markings attached to the outer surface area,
    wherein the cover is at least partially optically transparent so that the light of the spatially separated colors reflected from the optical surface is visible through the cover outer surface area around at least a portion of the visible markings, and
    electrical contacts accessible from outside of the device communicating with non-volatile re-programmable memory inside the device.

16. The memory device of claim 15, wherein the visible markings are positioned a distance from the optical surface so that patterns of the visible markings cast on the optical surface are themselves visible through the cover adjacent the visible markings.

17. The memory device of claim 16, wherein said distance is at least one-half millimeter.

18. The memory device of claim 16, wherein the patterns of the visible markings cast on the optical surface include reflections of the visible markings.

19. The memory device of claim 16, wherein at least a portion of the visual markings is opaque.

20. The memory device of claim 16, wherein the visible markings include alpha-numeric characters.

21. A package surrounding non-volatile re-programmable memory that comprises:
    a rainbow hologram film carried by at least one area of the package and having a diffusely reflective surface,
    a rigid cover positioned over the hologram film that is sufficiently optically transparent to allow viewing the hologram film therethrough,
    visible patterns attached to an outer surface of the cover in a manner that the hologram film is visible through the cover at least around the patterns, and
    electrical contacts accessible from outside of the package and communicating with the non-volatile re-programmable memory therein.

\* \* \* \* \*